United States Patent
Li

(10) Patent No.: US 12,140,754 B2
(45) Date of Patent: Nov. 12, 2024

(54) OPTICAL DISPLAY SYSTEM AND AUGMENTED REALITY ELECTRONIC DEVICE

(71) Applicant: Goertek Inc., Shandong (CN)

(72) Inventor: Lingshan Li, San Jose, CA (US)

(73) Assignee: Goertek Inc., Shandong (CN)

(*) Notice: Subject to any disclaimer, the term of this patent is extended or adjusted under 35 U.S.C. 154(b) by 497 days.

(21) Appl. No.: 17/566,019

(22) Filed: Dec. 30, 2021

(65) Prior Publication Data

US 2023/0213756 A1    Jul. 6, 2023

(51) Int. Cl.
| | |
|---|---|
| G02B 27/01 | (2006.01) |
| G02B 6/293 | (2006.01) |
| G02B 27/00 | (2006.01) |
| G02B 27/42 | (2006.01) |

(52) U.S. Cl.
CPC ..... G02B 27/0081 (2013.01); G02B 6/29323 (2013.01); G02B 27/0172 (2013.01); G02B 27/4205 (2013.01)

(58) Field of Classification Search
CPC ............ G02B 27/0081; G02B 27/0172; G02B 27/4205; G02B 6/29323; G02B 2027/0123; G02B 5/1823
USPC ....................................................... 359/567
See application file for complete search history.

(56) References Cited

U.S. PATENT DOCUMENTS

| | | | |
|---|---|---|---|
| 10,038,840 B2 | 7/2018 | Vallius | |
| 10,359,635 B2 | 7/2019 | Grey et al. | |
| 10,895,685 B2 | 1/2021 | Huang et al. | |
| 2018/0052276 A1* | 2/2018 | Klienman | ............ G02B 6/0023 |
| 2018/0052320 A1* | 2/2018 | Curtis | ................ G02B 27/0172 |
| 2018/0231702 A1* | 8/2018 | Lin | ........................... G02B 6/00 |
| 2019/0004321 A1 | 1/2019 | Grey et al. | |

(Continued)

FOREIGN PATENT DOCUMENTS

| | | |
|---|---|---|
| DK | 3175280 T3 | 5/2018 |
| EP | 0 618 473 A2 | 10/1994 |
| WO | WO 2008/081070 A1 | 7/2008 |

OTHER PUBLICATIONS

Chen et al., "Two dimensional silicon waveguide chirped grating couplers for vertical optical fibers," 283(10): 2146-2149 (2010) doi:10.1016/j.optcom.2010.01.059.

(Continued)

*Primary Examiner* — William R Alexander
(74) *Attorney, Agent, or Firm* — Baker Botts LLP

(57) ABSTRACT

An optical display system and an augmented reality electronic device are disclosed. The optical display system comprises: a waveguide; an input coupler, provided at the input end of the waveguide and couples an image light into it; and a two-dimensional grating, provided at the output end of waveguide. The waveguide delivers the image light to the two-dimensional grating, which performs pupil expansion on the image light and out-couples the expanded image light. The two-dimensional grating has rhombus lattices. Unit cells of the two-dimensional grating are un-symmetric along respective axes parallel with a propagation direction of the image light incident onto the two-dimensional grating, from a top view of the two-dimensional grating. The unit cells are oriented with the propagation direction of the image light and each of the unit cells has at least two vertexes at its end side.

15 Claims, 6 Drawing Sheets

(56) References Cited

U.S. PATENT DOCUMENTS

| | | | |
|---|---|---|---|
| 2020/0142110 A1* | 5/2020 | Lin | G02B 6/0016 |
| 2021/0191038 A1 | 6/2021 | Huang et al. | |
| 2022/0163709 A1* | 5/2022 | Lin | G02B 6/00 |
| 2023/0008461 A1* | 1/2023 | Ha | G02B 27/0081 |

OTHER PUBLICATIONS

Dammann et al., "Coherent optical generation and inspection of two-dimensional periodic structures," Optica Acta (Lond), 24(4): 505-515 (1977) doi:10.1080/713819570.

Heidarzadeh, "Incident light management in a thin silicon solar cell using a two-dimensional grating according a Gaussian distribution," Solar Energy, 189: 457-463 (2019) doi:10.1016/j.solener.2019.07.099.

Itoh et al., "Two-dimensional grating-based X-ray phase-contrast imaging using Fourier transform phase retrieval," Optics Express, 19(4):3339-3346 (2011) doi:10.1364/oe.19.003339.

Luo et al., "Low-loss two-dimensional silicon photonic grating coupler with a backside metal mirror," Optics Letters, 43(3): 474-477 (2018) doi:10.1364/ol.43.000474.

Kroker et al., "High efficiency two-dimensional grating reflectors with angularly tunable polarization efficiency," Appl Phys Lett., 102, 161111 (2013) doi:10.1063/1.4802883.

Meier et al., "Laser action from two-dimensional distributed feedback in photonic crystals," Appl Phys Lett., 74(1): 7-9 (1999) doi:10.1063/1.123116.

Paturzo et al., "Super-resolution in digital holography by a twodimensional dynamic phase grating," Optics Express, 16(21): 17107-17118 (2008) doi:10.1364/oe.16.017107.

Taillaert et al., "A compact two-dimensional grating coupler used as a polarization splitter," IEEE Photonics Technol Lett., 15(9): 1249-1251 (2003) doi:10.1109/LPT.2003.816671.

Tetz et al., "Excitation and direct imaging of surface plasmon polariton modes in a two-dimensional grating," Appl Phys Lett., 86, 111110 (2005) doi:10.1063/1.1883334.

Ye et al. "Color filter based on a two-dimensional submicrometer metal grating," Applied Optics, 48(27): 5035-5039 (2009) doi:10.1364/AO.48.005035.

Zhou et al., "Polarization-independent high diffraction efficiency two-dimensional grating based on cylindrical hole nano arrays," Optics Express, 28(20):28810-28818 (2020) doi:10.1364/oe.402131.

Zou et al., "Two-dimensional grating coupler with a low polarization dependent loss of 0.25 dB covering the C-band," Optics Letters, 41(18):4206-4209 (2016) doi:10.1364/ol.41.004206.

* cited by examiner

OPTICAL DISPLAY SYSTEM AND AUGMENTED REALITY ELECTRONIC DEVICE

FIELD OF THE INVENTION

This disclosure relates to the technical field of optical display system in an augmented reality device, and more specifically, to an optical display system and an augmented reality electronic device.

BACKGROUND OF THE INVENTION

In an augmented reality (AR) waveguide system or an AR electronic device, rays/image light emerged from a display is in-coupled into a waveguide by a grating responsive to the wavelength of the input image light, which is an input coupler. For example, the display may include a laser-beam scanner (LBS), a micro-LED display, or a liquid crystal on silicon (LCOS) display. The image light undergoes total internal reflection in the waveguide, and is finally out-coupled to the air using out-coupler gratings.

In addition, the AR electronic device may be provided with an Exit-Pupil Expansion (EPE) component to expand the image light in the viewing area.

PCT Application Publication No. WO 2008/081070 A1 discloses a device for expanding an exit pupil in two dimensions, which is hereby incorporated in its whole by reference.

U.S. Pat. No. 10,038,840 B2 discloses a diffractive optical element using crossed grating for pupil expansion, which is hereby incorporated in its whole by reference.

The article of "Two-dimensional grating-based X-ray phase-contrast imaging using Fourier transform phase retrieval" by Itoh H, Nagai K, Sato G, et al in Opt Express. 2011; 19(4):3339. doi:10.1364/oe.19.003339 discloses a solution of two-dimensional grating-based imaging, which is hereby incorporated in its whole by reference.

The article of "Coherent optical generation and inspection of two-dimensional periodic structures" by Dammann H and Klotz E in Opt Acta (Lond) in 1977; 24(4):505-515. doi: 10.1080/713819570 discloses solutions of coherent optical generation and inspection of two-dimensional periodic structures, which is hereby incorporated in its whole by reference.

The article of "Super-resolution in digital holography by a two-dimensional dynamic phase grating" by Paturzo M. Merola F, Grilli S. De Nicola S, Finizio A and Ferraro P in Opt Express. 2008; 16(21):17107. doi:10.1364-oe.16.017107 discloses a solution of two-dimensional dynamic phase grating, which is hereby incorporated in its whole by reference.

EP Patent Application No. 0 618 473 A2 discloses a video device utilizing a two-dimensional diffraction grating, which is hereby incorporated in its whole by reference.

The article of "Color filter based on a two-dimensional submicrometer metal grating" by Ye Y, Zhou Y, and Chen L in Appl Opt. 2009; 48(27):5035-5039. doi:10.1364/AO.48.005035 discloses a solution of a color filter based on a two-dimensional sub-micrometer metal grating, which is hereby incorporated in its whole by reference.

The article of "Two-dimensional grating coupler with a low polarization dependent loss of 025 dB covering the C-band" by Zou J, Yu Y and Zhang X in Opt Lett. 2016; 41(18):4206. doi:10.1364/ol.41.004206 discloses a solution of two-dimensional grating coupler, which is hereby incorporated in its whole by reference.

The article of "Two dimensional silicon waveguide chirped grating couplers for vertical optical fibers" by Chen X, Li C and Tsang H K in Opt Commun. 2010; 283(10): 2146-2149. doi:10.1016/j.optcom.2010.01.059 discloses a solution of two dimensional silicon waveguide chirped grating couplers, which is hereby incorporated in its whole by reference.

The article of "Incident light management in a thin silicon solar cell using a two-dimensional grating according a Gaussian distribution" by Heidarzadeh H in Sol Energy. 2019; 189(April):457-463. doi:10.1016/j.solener.2019.07.099 discloses a solution of two-dimensional grating, which is hereby incorporated in its whole by reference.

The article of "Low-loss two-dimensional silicon photonic grating coupler with a backside metal mirror" by Luo Y, Nong Z, Gao S, et al in Opt Lett. 2018; 43(3):474. doi:10.1364/ol.43.000474 discloses a solution of two-dimensional silicon photonic grating coupler, which is hereby incorporated in its whole by reference.

The article of "A compact two-dimensional grating coupler used as a polarization splitter" by Taillaert D, Chong H, Borel P I, Frandsen L I H. De La Rue R M, and Baets R in IEEE Photonics Technol Lett. 2003; 15(9):1249-1251. doi: 10.1109/LPT.2003.816671 discloses a solution of two-dimensional grating coupler, which is hereby incorporated in its whole by reference.

The article of "High efficiency two-dimensional grating reflectors with angularly tunable polarization efficiency" by Kroker S, Kasebier T, Steiner S, Kley E B. and Tunnermann A in Appl Phys Lett. 2013; 102(16). doi:10.1063/1.4802883 which is hereby incorporated in its whole by reference.

The article of "Excitation and direct imaging of surface plasmon polariton modes in a two-dimensional grating" by Tetz K A, Rokitski R, Nezhad M and Fainman Y in Appl Phys Lett. 2005; 86(11):1-3. doi:10.1063/1.1883334 discloses a solution of two-dimensional grating, which is hereby incorporated in its whole by reference.

The article of "Laser action from two-dimensional distributed feedback in photonic crystals" by Meier M, Mekis A, Dodabalapur A, et al in Appl Phys Lett. 1999; 74(1):7-9. doi:10.1063/1.123116 discloses a laser action from two-dimensional distributed feedback in photonic crystals, which is hereby incorporated in its whole by reference.

The article of "Polarization-independent high diffraction efficiency two-dimensional grating based on cylindrical hole nano arrays" by Zhou B, Jia W, Sun P, Wang J, Liu W, and Zhou C in Opt Express. 2020; 28(20):28810. doi:10.1364/oe.402131 discloses a two-dimensional grating, which is hereby incorporated in its whole by reference.

Danish Patent No. 3175280T3 and U.S. Pat. No. 10,359, 635 B2 discloses an exit pupil expanding diffractive optical waveguiding device, which is hereby incorporated in its whole by reference.

U.S. Pat. No. 10,895,685 B2 and US Patent Application No. 202110191038 A1 discloses Planar optical waveguide based on two-dimensional optical gratings having 60° grating directions, which is hereby incorporated in its whole by reference.

SUMMARY OF THE INVENTION

One object of this disclosure is to provide a new technical solution for an optical display system.

According to a first aspect of the present disclosure, there is provided an optical display system, comprising: a waveguide; an input coupler, which is provided at the input end of the waveguide and couples an image light into the waveguide; and a two-dimensional grating, which is provided at the output end of the waveguide, wherein the waveguide delivers the image light coupled by the input coupler to the two-dimensional grating, and the two-dimensional grating performs pupil expansion on the image light and out-couples the expanded image light, wherein the two-dimensional grating has rhombus lattices, wherein unit cells of the two-dimensional grating are un-symmetric along respective axes parallel with a propagation direction of the image light incident onto the two-dimensional grating, from a top view of the two-dimensional grating, and wherein the unit cells are oriented with the propagation direction of the image light and each of the unit cells has at least two vertexes at its end side.

According to a second aspect of the present disclosure, there is provided an augmented reality electronic device, including: a display, which generates an image light; and the optical display system according to an embodiment, which receives the image light and guides it to an eye.

According to an embodiment of this disclosure, the performance of the optical display system can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification. illustrate embodiments of the disclosure and, together with the description thereof. serve to explain the principles of the invention.

DETAILED DESCRIPTION OF THE EMBODIMENTS

Figure 1:
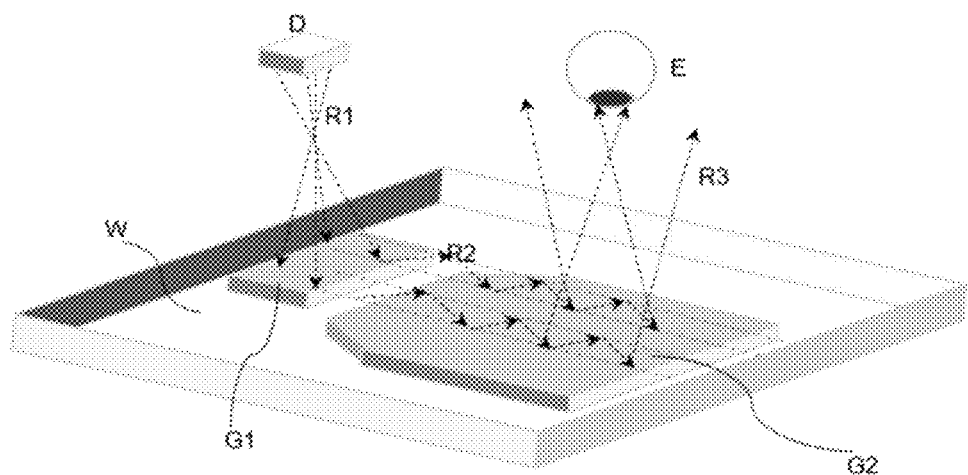
FIG. 1 shows a schematic diagram of a structure for an electronic device including an optical display system according to an embodiment.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 shows a schematic diagram of a structure for an electronic device including an optical display system according to an embodiment. The electronic device may be an augmented reality (AR) electronic device, for example.

As shown in FIG. 1, the electronic device includes a display D. The display D generates an image light/ray R1. The display D may be a laser-beam scanner (LBS), a micro-LED display, a liquid crystal on silicon (LCOS) display and so on.

The electronic device further includes an optical display system. The optical display system receives the image light from the display D and guides it to an eye of a viewer. The optical display system includes a waveguide W, an input coupler G1 and a two-dimensional grating G2.

The optical system is used to create an immersive scene and to fulfill the requirement of good color/brightness uniformity within the field of view (FOV) in one single pupil.

As shown in FIG. 1, the image light R1 is coupled into a waveguide W by an input coupler G1. The input coupler G1 is provided at the input end of the waveguide W. The input coupler G1 may be an input coupler grating, such as a one-dimensional input coupler grating.

A two-dimensional grating G2 is provided at the output end of waveguide W. The waveguide W delivers the image light R2 coupled by the input coupler G1 to the two-dimensional grating G2. The in-coupled image light R2 travels in the waveguide W in a total internal reflection TIR manner. The two-dimensional grating G2 performs pupil expansion on the image light R2 and out-couples the expanded image light R3. The expanded image light R3 is incident into an eye E of a viewer directly or indirectly. For example, an optical unit may further be disposed between the two-dimensional grating G2 and the eye E.

Figure 2:
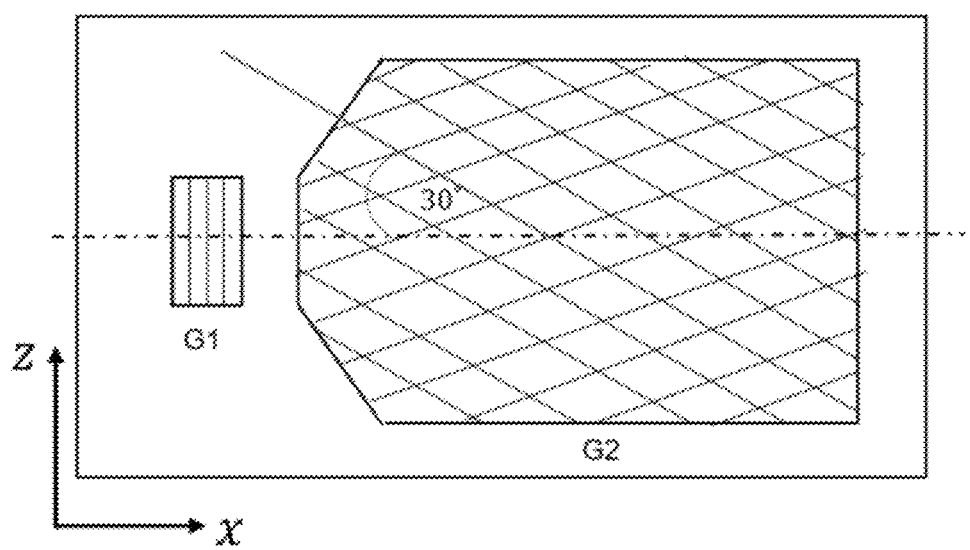
FIG. 2 shows a schematic top view of an optical display system according to an embodiment.

FIG. 2 shows a schematic top view of an optical display system according to an embodiment. As shown in FIG. 2, the input coupler G1 is a one-dimensional grating, for example. The grating lines of the input coupler G1 is horizontal.

The two-dimensional grating G2 has rhombus lattices. For example, the rhombus lattices are ±30 degree related to the propagation direction as shown in FIG. 2.

For example, the two-dimension grating G2 is a surface relief grating. In the prior art, a the two-dimension grating has long been used to do spatial filter. wavelength filter, fiber-chip coupling of photonic integrated circuits, light reflecting. polarization beam splitter, far-field-imaging, and laser resonator. Here, the two-dimensional grating is used here to perform both exit-pupil expansion and out-coupling.

The two-dimensional grating can be used to implement the grating-vector and wave-vector addition/subtraction principle and it can also provide lattice and unit cell to provide various way of energy distribution by allowing more freedoms of adding different symmetry and duty cycle (DC) in two-dimension. These freedoms on physical parameters provide more flexibilities for the TDGs to act as both an exit-pupil expansion grating and an output coupler grating (OCG).

Figure 3:
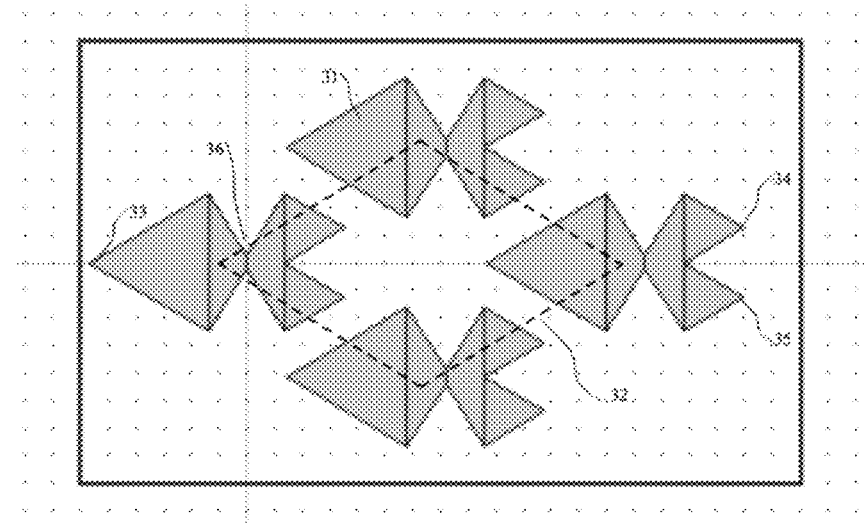
FIG. 3 shows a schematic top view of a two-dimensional grating according to an embodiment.
Figure 4:
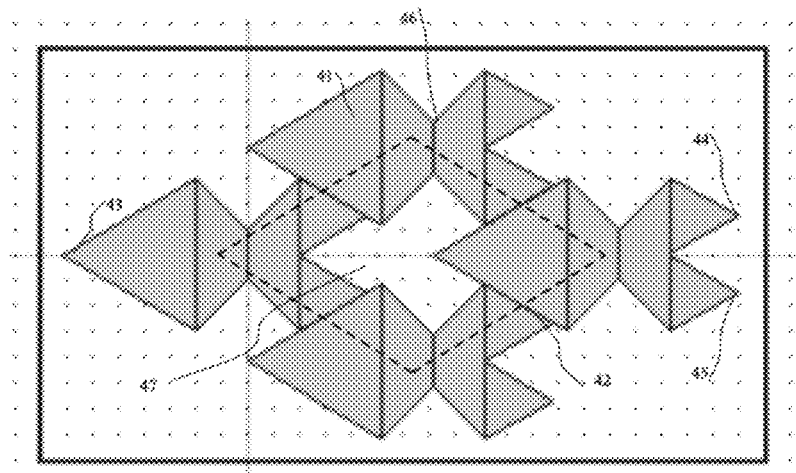
FIG. 4 shows a schematic top view of a two-dimensional grating according to another embodiment.
Figure 5:
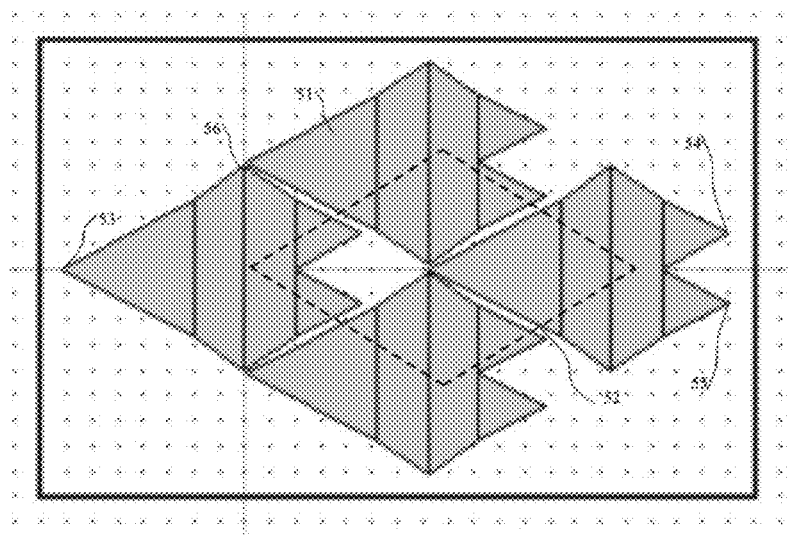
FIG. 5 shows a schematic top view of a two-dimensional grating according to still another embodiment.

FIGS. 3-5 shows top views of the two-dimensional gratings according to various embodiments.

In FIGS. 3-5, unit cells 31, 41, 51 of the two-dimensional grating are un-symmetric along respective axes parallel with a propagation direction of the image light incident onto the two-dimensional grating, from a top view of the two-dimensional grating. In FIGS. 3-5, the propagation direction is from left to right. The un-symmetric structure of the unit cell could provide a higher exit-pupil expansion efficiency. For example, the un-symmetric structure could reduce the intensity differences of lights-rays with different polarization. which provide a better uniformity for the image light. In addition, by using this un-symmetric unit cell, diffraction efficiencies for different polarizations (p and s polarizations) can be compensated by each other, so as to provide a uniform color output.

The unit cells 31, 41, 51 are oriented with the propagation direction of the image light and each of the unit cells has at least two vertexes (34, 35), (44, 45), (54, 55) at its end side. These vertexes could improve the diffraction efficiency and uniformity and thus the grating can be made thinner. It is easier to manufacture a thinner grating, and thus the manufacturing yield could be improved.

With the eye position variation or movement in a viewing electronic device such as a heads-up displays (HUDs) being considered, the uniformity and color balance requirement are addressed here in an extended pupil, or eyebox (EB), so that when an eye position of a viewer changes or eye movement occurs, the brightness and RGB balance still maintain at detectable range of human eye. For example, in a HUD, the image resolution seen by a viewer which is the modulation transfer function (MTF) of the system, is directly related to the contrast ratio (CR) of the rendering image. For example, constant ambient light in the electronic device lays the background, and the brightness of RGB colors determines the MTF of a rendering image.

Here, the two-dimensional grating could achieve an efficient energy distribution to guarantee both the RGB brightness magnitude and uniformity within the viewing device such as an eyebox (EB). The embodiment can also achieve an Exit-Pupil expansion (EPE) with a thinner device profile. has to been implemented.

FIG. 3 shows a lattice 32 of the two-dimensional grating. The lattice 32 is formed by four unit cells 31. In FIG. 4, a lattice 42 is formed by four unit cells 41. In FIG. 5, a lattice 52 is formed by four unit cells 51.

An index of the two-dimensional gratings may be equal to or larger than 1.7 or be equal to or larger than 1.8. In this embodiment, a higher index material for the two-dimensional gratings could be used, so that an image with a wider field of view could be coupled in the system and be delivered to a viewer's eye. In addition, because of the un-symmetric pattern of the unit cell, the expansion differences of different polarization are reduced. The relatively high index will not cause a significant image disorder compared with other two-dimensional gratings. So, the embodiment could provide a wider field of view by using a relatively high index material of the two-dimensional grating while keeping an acceptable display performance.

A thickness of the two-dimensional grating is equal to or smaller than 200 nm or 100 nm. In this embodiment, the two-dimensional grating could achieve a high diffraction efficiency and thus its thickness can be made thinner than others. The thinner thickness makes it easier for manufacturing and thus the yield of the product could be improved.

As shown in FIGS. 3-5, the unit cells 31, 41 and 51 are oriented with the propagation direction of the image light and vertex angles of the unit cells starting from orientation positions are larger than 45 degrees and smaller than 60 degrees. Compared with unit cells with vertex angles of 60 degrees, the smaller vertex angle in this embodiment could make the lateral index changes of the two-dimensional grating tend to be faster, which will improve the exit-pupil expansion diffraction efficiency. This also improve the uniformity and/or brightness of the colours. The angles shall be above 45 degree to keep a relatively reasonable diffraction performance.

The unit cells 31, 41 and 51 have waists 36, 46 and 56 along the propagation direction. As shown in FIGS. 3-5, a part of the unit cell 31, 41 or 51 before the waist 36, 46 or 56 is longer than that after the waist along the propagation direction. As such, the index changes at the part after the waist tend to be larger, and the diffraction efficiency and uniformity will be improved.

FIG. 3 shows that the four unit cells 31 form the lattice 32 of rhombus shape. The unit cells 31 are separated from each other by gaps therebetween. As shown in FIG. 3, the two-dimensional grating adopts a diamond lattice or a lattice with rhombus shape. The unit cell 31 is un-symmetric along the light propagation axis, i.e. x axis. The duty cycle DC of the two dimensional grating in FIG. 3 may range from 0.3 to 0.7 and the index n of the two dimensional grating is 1.7.

There are gaps in both horizontal and vertical axis. Such gaps add new freedom of modifying the diffraction efficiency of the different polarization as well as improving the total diffraction efficiency of the two-dimensional grating. In FIG. 3, the vertex angle ranges from 55 to 60 degree. The unit cell 31 shape is oriented with the length direction along the light propagation axis. This unit cell 31 can have different thickness or gap factor along the waist 36. In FIG. 3, the waist 36 is narrower than other portions. Coating material can be applied to the two-dimensional grating to improve the reflection efficiency. The thickness of the two-dimensional grating ranges from 50 nm to 200 nm.

FIG. 4 shows that the four unit cells 41 form the lattice 42. The unit cells 42 are connected into a closed shape. The connection configuration makes it easier to manufacture the two-dimensional grating.

In addition, as shown in FIG. 4, the part 47 of the two-dimensional grating enclosed by the unit cells 41 form a low index unit cell. The part 47 has lower index than that of the unit cells 41. The part 47 is also un-symmetric along respective axes parallel with the propagation direction and has at least two vertexes at its end side, as shown in FIG. 4. Although only one part 47 is shown in FIG. 4, it should be understood that same parts 47 could also be formed by other cell units 41 in the two-dimensional grating.

For example, the parts 47 could be hollow (hole) and thus the index difference between the parts 47 and the unit cells 41 will be even larger. This will improve the performance of the two-dimensional grating. In addition, the hollow part or hole 47 inside the two dimensional grating has the ability to adjust the polarization ratio between the pupil expansion and the out-coupling of the two dimensional grating. The duty cycle DC of the two dimensional grating in FIG. 4 may range from 0.5 to 1.

In FIG. 5, the unit cells 51 have thickness factors along the waist 56 larger than those of other portions. The two dimensional grating in FIG. 5 has the narrow gap between different unit cells 51, the duty cycle DC of the two dimensional grating in FIG. 5 may range from 0.5 to 0.95.

In FIGS. 3-5, the unit cells 31, 41 and 51 have diamond-like bow-tie shapes. A duty cycle of the two-dimension grating ranges from 0.5 to 0.95.

As discussed above, the two-dimensional grating has the potentials of manipulating the polarization efficiency by adjusting unit cell gap, cell structure and so on, which make the two-dimensional grating more advantageous compared to one-dimensional surface relief gratings.

As shown in FIGS. 1 and 2, the waveguide W is a one-layer waveguide and the input coupler G1 and the two-dimensional grating G2 are formed on/in the one-layer waveguide W, so as to provide a compact optical display system.

As such, the embodiments can use the grating-vector addition/subtraction principle and can be optimized through self-written optimization algorithm using the thickness, gap, duty cycle, lattice category and vertex angle as variable. The rigorous coupled wave analysis (RCWA) algorithm can be applied to the embodiment.

The two-dimensional gratings in the embodiments can follow the design principle of grating-vector addition/subtraction. The two-dimensional gratings can perform both exit-pupil expansion and out-coupling. It demonstrates a higher efficiency. Besides, the two-dimensional gratings in the embodiments can have much better balance between two polarizations, making it suitable for some unpolarized displays such as micro-LEDs.

A two-dimensional granting according to an embodiment can provide more design freedom to improve the diffraction efficiency.

Furthermore, a two-dimensional granting according to an embodiment can improve imbalance between different polarization.

In addition, a two-dimensional granting according to an embodiment can manifest equally excellent or more advance capability to deal with the incident light within FOV.

Besides, a two-dimensional granting according to an embodiment can provide the compactness of the optical display system and balance the unit cell complexity with more design freedom.

Figure 6:
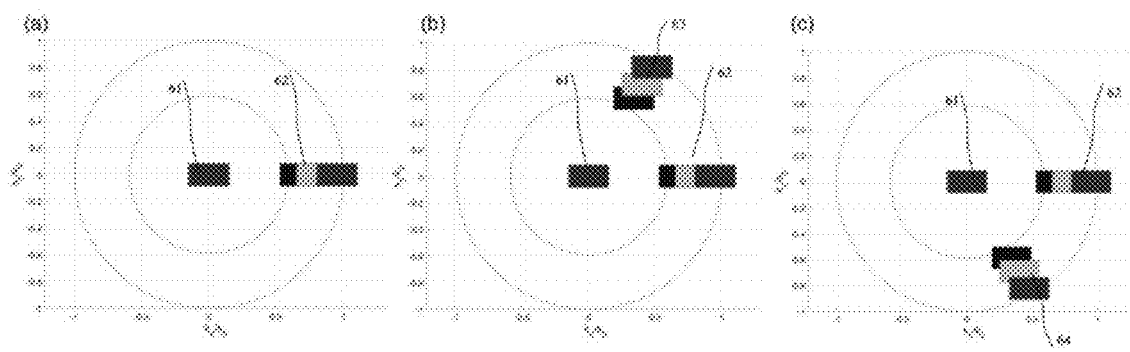
FIG. 6 shows illustrative K-spaces of different diffractions.

FIG. 6 shows resulted K-spaces of an incident image ray main beam traveling through an optical display system. As shown in FIG. 6 (a), the incident main beam 61 is in the middle of the diagram. For example, the horizontal FOV θ=30°, image ratio is 16:9. and the index n of the waveguide and the gratings is 1.7. The main beam 61 goes through the optical display system and is output as beam 62. The beam 62 disperses as shown in FIG. 6 (a). For example, the red, green and blue components of the beam 62 disperse.

In FIG. 6 (b), the optical display system has an exit-pupil expansion on +z direction. As shown in FIG. 6 (b), an extra beam 63 is formed through the optical display system on the +z direction.

In FIG. 6 (b), the optical display system has an exit-pupil expansion on −z direction. As shown in FIG. 6 (b), an extra beam 64 is formed through the optical display system on the −z direction.

It can be seen from FIG. 6 that the beams 62, 63 and 64 are within an acceptable range after going through the optical display system.

Figure 7:
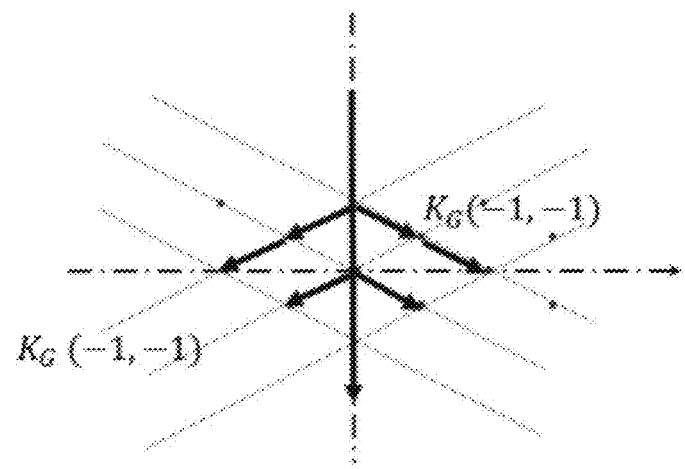
FIG. 7 shows the reverse lattices of wavevector of the two-dimensional grating according to an embodiment.

FIG. 7 shows the reverse lattices of wavevector of the two-dimensional grating according to an embodiment.

Figure 8:
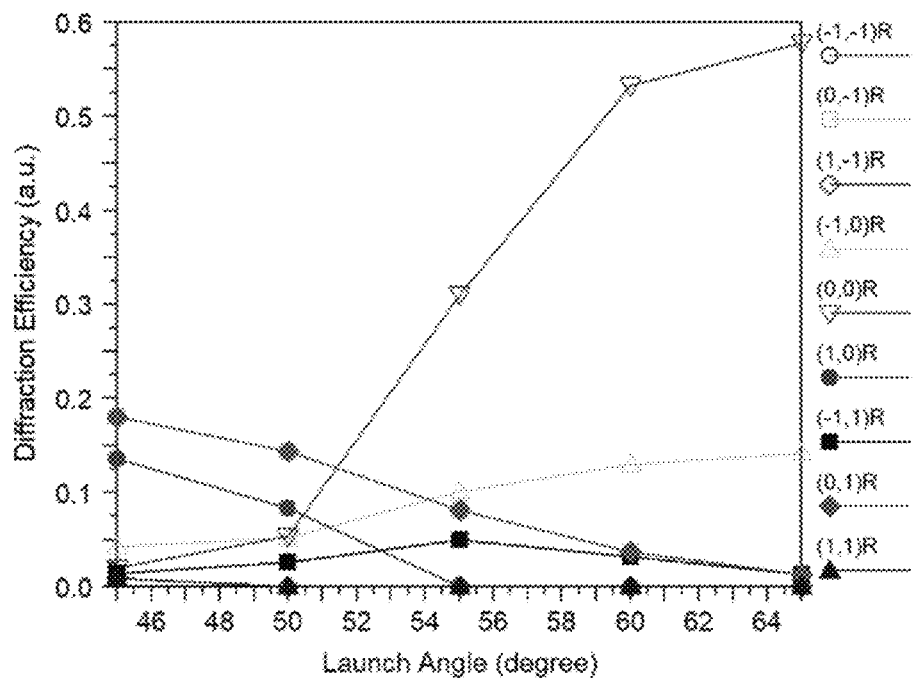
FIG. 8 shows diffractions of a two-dimensional grating according to an embodiment with p-polarization incident field varied by launch angle.
Figure 9:
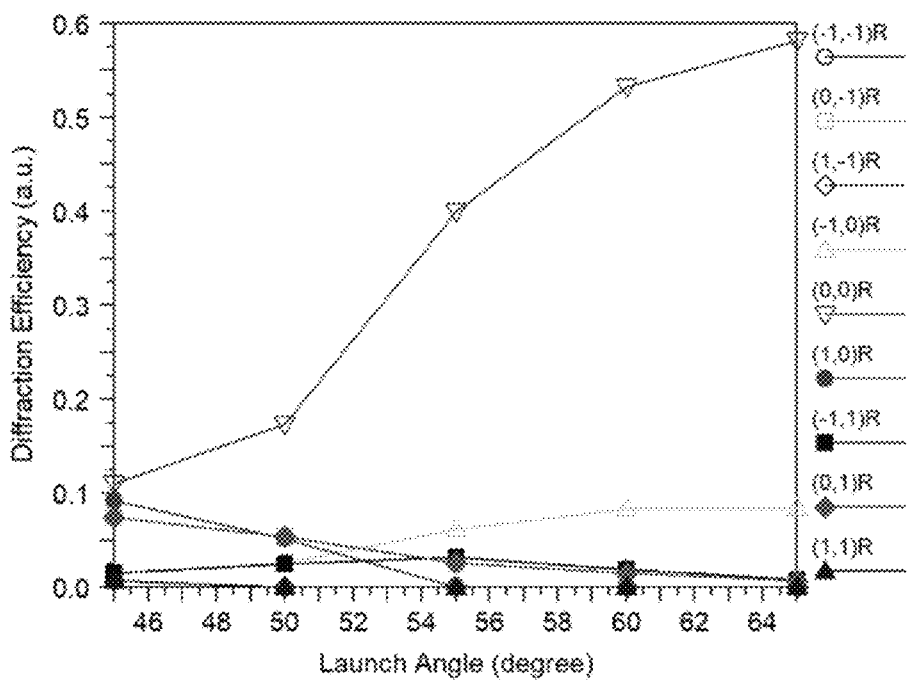
FIG. 9 shows diffractions of a two-dimensional grating according to an embodiment with s-polarization incident field varied by launch angle.

FIG. 8 shows diffractions of a two-dimensional grating according to an embodiment with p-polarization incident field varied by launch angle. FIG. 9 shows diffractions of a two-dimensional grating according to an embodiment with s-polarization incident field varied by launch angle. In FIGS. 8 and 9, the rays have a wavelength λ=532 nm. The (−1,0) R is the order for the main beam diffraction without pupil expansion. The (−1,1) R is the order for the beam has pupil expansion on TDGs.

From FIGS. 8 and 9, it can be seen that at the total internal reflection TIR angle of WG index the polar angle of the ray of the central view is around θ=52°. Both p-polarization and s-polarization rays show relatively higher diffraction efficiency (DE).

Table 1 shows a comparison of the performances of an embodiment of this disclose with lattice angle less than 60 degree and a two-dimensional grating TDG with lattice angle of 60 degree.

TABLE 1

| Order Green Light | Purpose | DE Central View (P-Polarization) | | DE Central View (S-Polarization) | |
|---|---|---|---|---|---|
| | | Embodiment | TDG of 60 degree lattice | Embodiment | TDG of 60 degree lattice |
| (−1, ±1) | Pupil Expansion | 5% | 7% | 3% | 2% |
| (−1, 0) | Central View Output Order | 10% | 6% | 6% | 15% |
| (0, 0) | All Direction Propogation | 30% | 28% | 40% | 54% |

It can be seen from Table 1 that by using the two-dimensional grating with lattice angle less than 60 degrees. imbalance between the diffraction efficiencies DE of different polarizations can be reduced.

Figure 10:
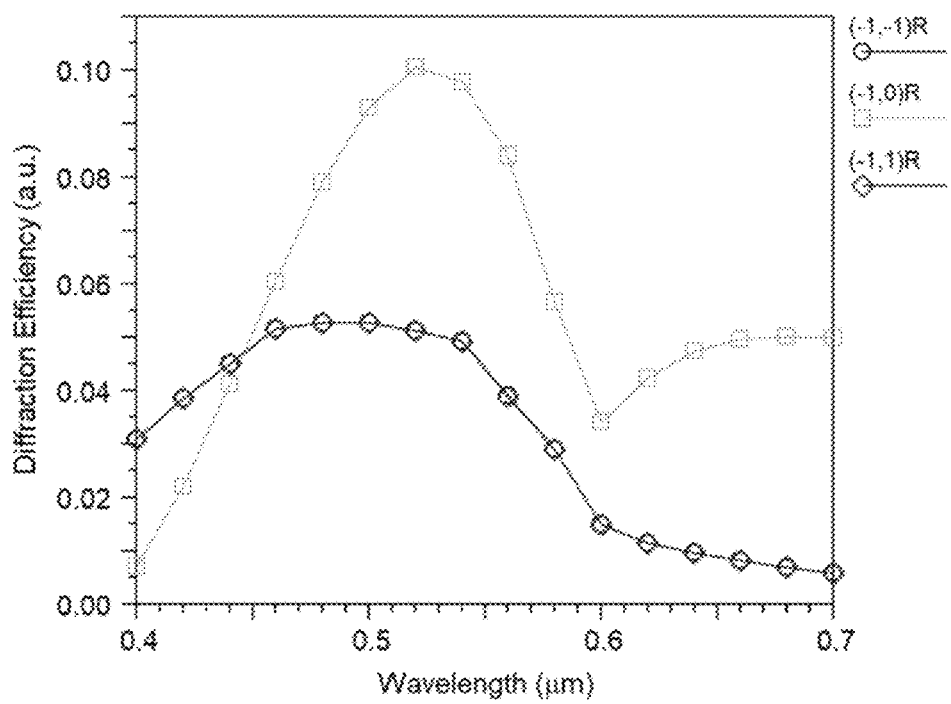
FIG. 10 shows diffractions of a two-dimensional grating according to an embodiment with p-polarization incident field varied by wavelength.
Figure 11:
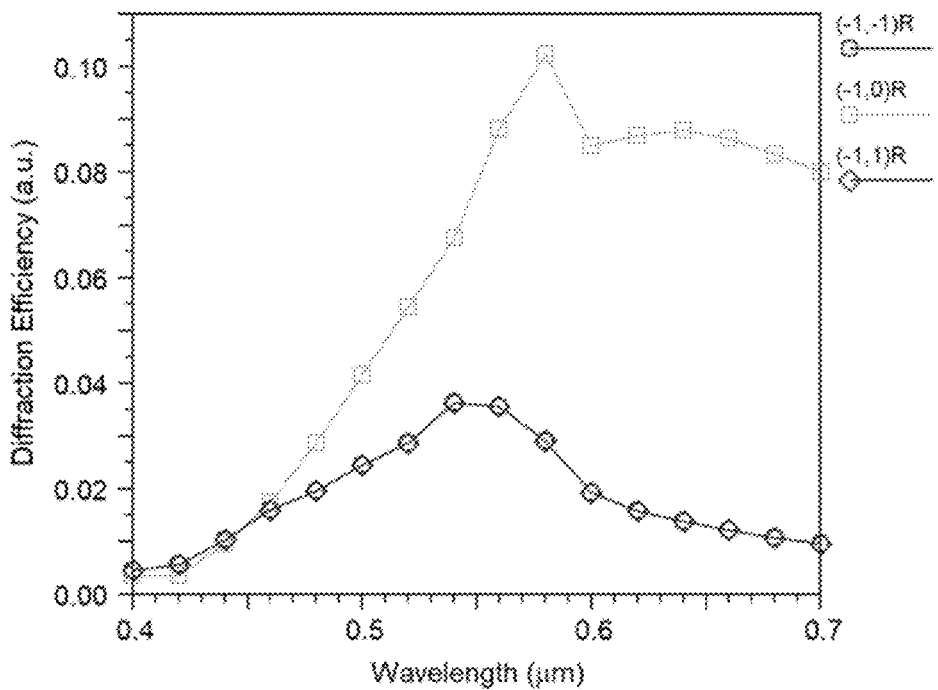
FIG. 11 shows diffractions of a two-dimensional grating according to an embodiment with s-polarization incident field varied by wavelength.

FIG. 10 shows diffractions of a two-dimensional grating according to an embodiment with p-polarization incident field varied by wavelength. FIG. 11 shows diffractions of a two-dimensional grating according to an embodiment with s-polarization incident field varied by wavelength. That is, FIGS. 10 and 11 show diffraction wavelength response of the two-dimensional grating according to an embodiment. In FIGS. 10 and 11, the incident angles of the rays are θ=52°. The (−1,0) R. is the order for the main beam diffraction without pupil expansion. The (−1,1) R is the order for the beam has pupil expansion on two-dimensional grating.

As can be seen from the wavelength response of the FIGS. 10 and 11. although the wavelength responses are not very uniform with one type of polarization (p-polarization or s-polarization), the other type of polarization (s-polarization or p-polarization) will show a compensated effect of wavelength response. For example, in FIG. 10, both blue and green lights (around 435 nm and 546 nm) have relatively high diffraction efficiencies DE compared to red light (around 700 nm) for p-polarization, while in FIG. 11, the green and red lights have relatively high diffraction efficiencies DE. Since a human eye senses the light intensity rather than its polarization, this compensation phenomenon of the optical display system according to an embodiment of this disclosure can be used to provide a uniform light output. So, this phenomenon can be beneficial to mitigate the colour non-uniformity of the whole system.

Table 2 and Table 3 show comparisons of an embodiment in this disclosure with lattice angle less than 60 degree and two-dimensional gratings TDGs with lattice angle of 60 degree.

Table 2 shows the comparison of output coupling efficiency in the case of pupil expansion.

TABLE 2

| FOV Position | Ray angle 1 $1^{st}$ time on TDG | Ray angle 2 $2^{st}$ time on TDG | Output Coupling Efficiency |
|---|---|---|---|
| Central View | (θ, φ) = (53°, 0) | (θ, φ) = (53°, −60°) | S: 5.13%*1.19% = 0.06% (<60°) 2%*0.23% = 0.04% (=60°) P: 4.12%*1.76% = 0.07% (<60°) 7.6%*0.3% = 0.02% (=60°) |

Table 3 shows the comparison of output coupling efficiency in the case of direct output.

TABLE 3

| FOV Position | Ray angle 1 $1^{st}$ time on TDG | Output Coupling Efficiency |
|---|---|---|
| Central View | (θ, φ) = (53°, 0) | S: 4.63% (<60°) 2.49% (=60°) P: 5.20% (<60°) 3.83% (=60°) |

Table 2 and Table 3 shows that the two-dimensional grating with lattice angle less than 60 degree according to an embodiment herein will manifest a higher diffraction efficiency both in the scenarios of direct output and pupil expansion. in addition, the two-dimensional grating with lattice angle less than 60 degree also shows improved balance of intensity between different polarization.

Figure 12:
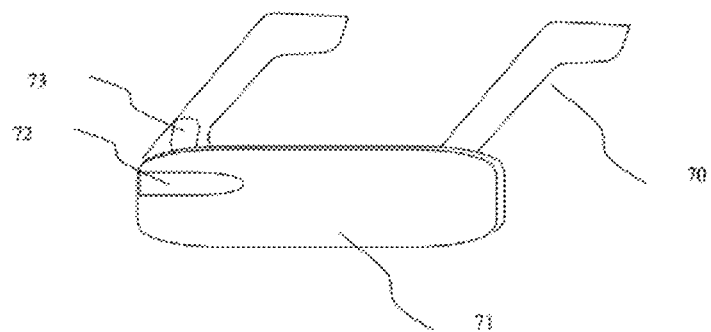
FIG. 12 shows an example of an electronic device according to an embodiment.

FIG. 12 shows an example of an electronic device according to an embodiment. The electronic device 71 may be an AR glass. The electronic device 71 may include a display 73 and an optical display system 72 as described above.

Although some specific embodiments of the present invention have been demonstrated in detail with examples, it should be understood by a person skilled in the art that the above examples are only intended to be illustrative but not to limit the scope of the present disclosure.

What is claimed is:

1. An optical display system, comprising:
a waveguide,
an input coupler, which is provided at the input end of the waveguide and couples an image light into the waveguide; and
a two-dimensional grating, which is provided at the output end of the waveguide,
wherein the waveguide delivers the image light coupled by the input coupler to the two-dimensional grating, and the two-dimensional grating performs pupil expansion on the image light and out-couples the expanded image light,
wherein the two-dimensional grating has rhombus lattices,
wherein a plurality of unit cells of the two-dimensional grating are un-symmetric along respective axes parallel with a propagation direction of the image light incident onto the two-dimensional grating, from a top view of the two-dimensional grating, and
wherein the plurality of unit cells are oriented with the propagation direction of the image light and each of the plurality of unit cells has at least two vertexes at its end side.

2. The optical display system according to claim 1, wherein an index of the two-dimensional grating is equal to or larger than 1.7 or 1.8.

3. The optical display system according to claim 1, wherein a thickness of the two-dimensional grating is equal to or smaller than 200 nm or 100 nm.

4. The optical display system according to claim 1, wherein the plurality of unit cells are oriented with the propagation direction of the image light and vertex angles of the unit cells starting from orientation positions are larger than 45 degree and smaller than 60 degree.

5. The optical display system according to claim 1, wherein the plurality of unit cells have waists along the propagation direction.

6. The optical display system according to claim 5, wherein a part of each of the plurality of unit cells before the waist is longer than that after the waist along the propagation direction.

7. The optical display system according to claim 5, wherein the plurality of unit cells have thickness factors along the waist larger than those of other portions.

8. The optical display system according to claim 1, wherein the plurality of unit cells are connected into a closed shape.

9. The optical display system according to claim 7, wherein parts of the two-dimensional grating enclosed by the plurality of unit cells have a lower index and form low index unit cells, which are un-symmetric along respective axes parallel with the propagation direction and each of which has at least two vertexes at its end side.

10. The optical display system according to claim 1, wherein the waveguide is a one-layer waveguide and the input coupler and the two-dimensional grating are formed on or in the one-layer waveguide.

11. The optical display system according to claim 1, wherein the plurality of unit cells have diamond-like bow-tie shapes.

12. The optical display system according to claim 1, wherein the rhombus lattices are ±30 degree related to the propagation direction.

13. The optical display system according to claim 1, wherein a duty cycle of the two-dimension grating ranges from 0.5 to 0.95.

14. The optical display system according to claim 1, wherein the two-dimension grating is a surface relief grating.

15. An augmented reality electronic device, including:
a display, which generates an image light; and
the optical display system according to claim 1, which receives the image light and guides it to an eye.

* * * * *